United States Patent
Kimberlin et al.

[15] 3,648,490
[45] Mar. 14, 1972

[54] COINCIDENTAL LOCK

[72] Inventors: Dan R. Kimberlin, Saginaw; Floyd A. Schluckebier, Frankenmuth, both of Mich.

[73] Assignee: General Motors Corporation, Detroit, Mich.

[22] Filed: Dec. 18, 1970

[21] Appl. No.: 99,619

[52] U.S. Cl. ............................................. 70/186, 70/252
[51] Int. Cl. ........................................................ B60r 25/02
[58] Field of Search ........................... 70/186, 210, 211, 252

[56] References Cited

UNITED STATES PATENTS

| | | |
|---|---|---|
| 1,752,282 | 3/1930 | Brauning ............................ 70/252 X |
| 2,101,446 | 12/1937 | Neiman ................................. 70/186 |
| 3,132,503 | 5/1964 | Pieck et al. ............................. 70/186 |
| 3,261,187 | 7/1966 | Eichenauer ............................ 70/252 |

*Primary Examiner*—Albert G. Craig, Jr.
*Attorney*—W. E. Finken and D. L. Ellis

[57] ABSTRACT

A coincidental lock adapted for vehicle steering column applications includes a lock bolt movable between locking and unlocking positions, a latch operative in a latched position to prevent movement of the latch bolt to the locking position, a lock cylinder on the steering column supporting a pawl for engagement on a key when the latter is inserted in the lock cylinder, and means operably connecting the pawl and the latch. The key, upon insertion in the lock cylinder, bodily moves the pawl into a cavity in the lock cylinder and maintains the pawl therein and the pawl, upon bodily movement thereof, urges the latch toward the latched position to prevent locking movement of the lock bolt once the latter achieves the unlocking position and as long as the key remains in the lock cylinder.

3 Claims, 10 Drawing Figures

Patented March 14, 1972
3,648,490
2 Sheets-Sheet 1
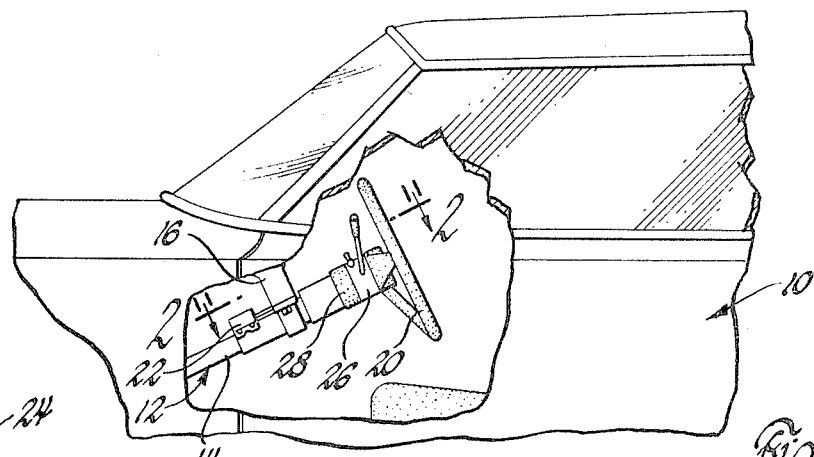
Fig.1
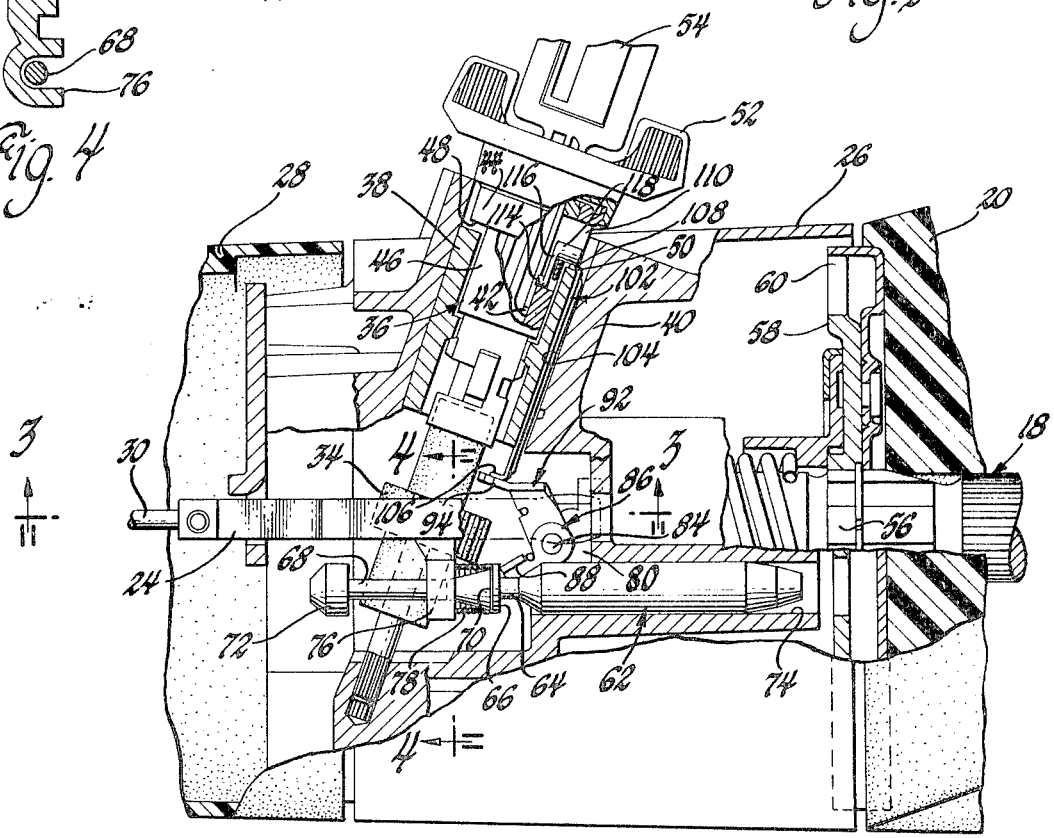
Fig.4
Fig.2
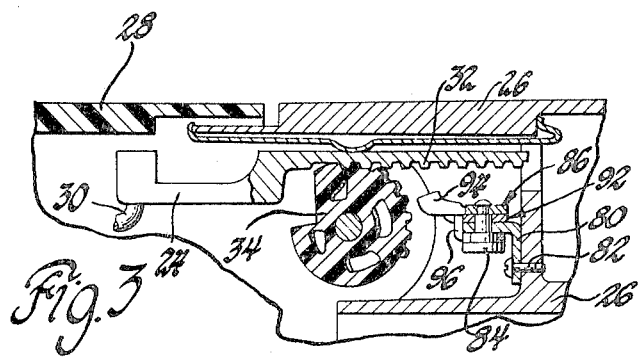
Fig.3
INVENTORS
Dan R. Kimberlin, &
BY Floyd A. Schluckebier
D. L. Ellis
ATTORNEY

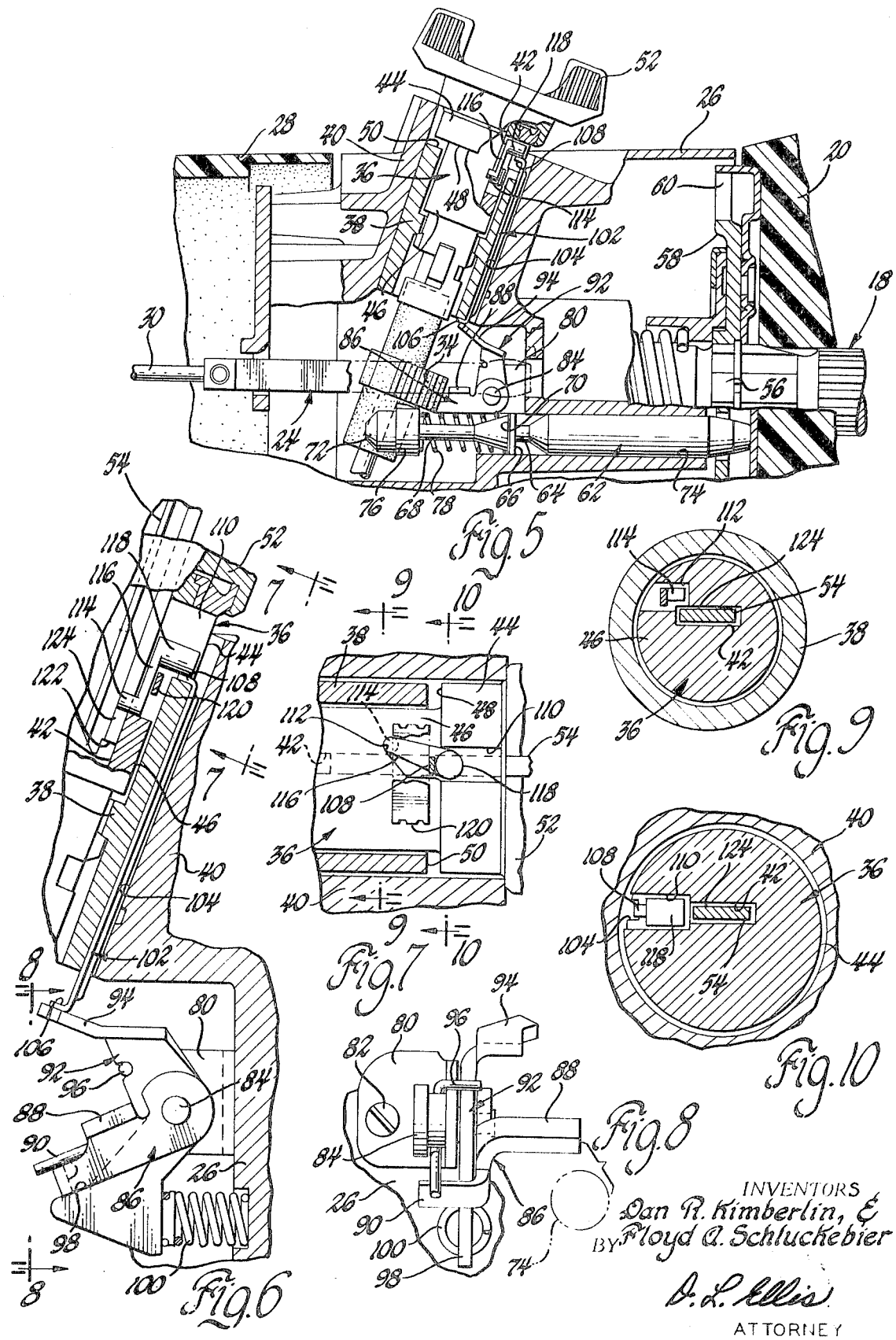

COINCIDENTAL LOCK

This invention relates to coincidental locks and particularly to coincidental locks adapted for vehicle steering column applications and including means for preventing locking of the steering shaft as long as the key remains in the coincidental lock.

The primary feature of this invention is that it provides an improved coincidental lock particularly adapted for vehicle steering column applications and including means operative to inhibit relocking of the vehicle steering shaft as long as the key remains inserted in the coincidental lock. Another feature of this invention resides in the provision of inhibitor means, operative until the key is fully withdrawn, which includes a pawl supported on one of the lock cylinder and cooperating sleeve of the coincidental lock for bodily movement and operatively connected to the latch means, the pawl being engageable by the key upon insertion thereof into the lock cylinder and the key thereafter being operative to move the pawl into a position in a cavity and to retain the pawl therein, the pawl in such position urging the latch means to a latched position engaging the steering shaft lock bolt and preventing locking movement thereof. A still further feature of this invention resides in the provision of an actuating member connected to the pawl and movable longitudinally of the lock cylinder in response to movement of the pawl into the cavity, the actuating member being engageable on a push rod and operative to move the latter from an extended position to a retracted position wherein the push rod yieldingly urges the latch means into retaining engagement with the steering shaft lock bolt so as to inhibit relocking movement of the latter once it achieves an unlocking position.

These and other features of this invention will be readily apparent from the following specification and from the drawings wherein:

FIG. 1 is a fragmentary partially broken away elevational view of an automotive vehicle body including a steering column and a coincidental lock therefor according to this invention;

FIG. 2 is a partially broken away view taken generally along the plane indicated by lines 2—2 in FIG. 1 and showing the key inserted in the lock cylinder of the coincidental lock;

FIG. 3 is a sectional view taken generally along the plane indicated by lines 3—3 in FIG. 2;

FIG. 4 is a sectional view taken generally along the plane indicated by lines 4—4 in FIG. 2;

FIG. 5 is similar to FIG. 2 but showing the key removed;

FIG. 6 is an enlarged view of a portion of FIG. 2 showing the lock bolt movement inhibiting means;

FIG. 7 is a view taken generally along the plane indicated by lines 7—7 in FIG. 6;

FIG. 8 is a view taken generally along the plane indicated by lines 8—8 in FIG. 6;

FIG. 9 is a sectional view taken generally along the plane indicated by lines 9—9 in FIG. 7; and FIG. 10 is a sectional view taken generally along the plane indicated by lines 10—10 in FIG. 7.

Referring now particularly to FIG. 1 of the drawings, a vehicle body 10 includes a steering column assembly 12 mounted in the forward passenger compartment and extending through the body firewall of the vehicle engine compartment, not shown. The steering column, as is conventional, includes an outer support column or tube 14 mounted on the body 10 by means of a bracket 16 on the instrument panel structure of the body and additionally by a similar bracket on the firewall structure. The support column 14 conventionally rotatably mounts therewithin the vehicle steering shaft 18 which carries at its upper end a steering wheel 20.

Reference may be made to U.S. Pat. Wight et al. No. 3,490,255, issued Jan. 20, 1970 and assigned to the assignee of this invention, for a more complete understanding of the general type of steering column coincidental lock disclosed herein, but generally the lock includes provision for selective prevention of rotation of the vehicle steering shaft 18. Coincidentally therewith, an ignition switch 22 mounted on the support column 14 is placed in an inoperative condition during the locked condition of the steering shaft.

Specifically, referring to FIGS. 2 and 3, a shift bolt 24 is suitably mounted for slidable movement in a channel in a die cast or similarly constructed stationary housing portion 26 of the steering column, a decorative annular member 28 generally contiguous with the outer surface of housing 26 also being rigidly secured to the steering column just below the housing. A switch actuating rod 30 is attached to the end of shift bolt 24 and extends to the ignition switch 22 for operating of the ignition switch between "off" and "on" conditions simultaneously with reciprocation of the shift bolt 24 and for accomplishing additional switch functions such as starter motor activation and accessory energization. The shift bolt 24 is selectively moved in its path between the various above-noted positions by a rack and sector connection including a rack 32 integral with the shift bolt and a toothed sector 34 rotatable as a unit with a lock cylinder 36 mounted in a sleeve 38, the sleeve being rigidly secured to the housing 26 within a boss 40 thereof. The lock cylinder preferably includes a plurality of key operable tumblers and a side locking bar extensible by key withdrawal to selectively lock the cylinder in fixed rotary position within sleeve 38. As seen best in FIGS. 2, 9 and 10, the lock cylinder 36 further includes a key slot 42, a large diameter portion 44 and a small diameter portion 46, the large and small diameter portions defining a shoulder 48 which is spaced from the end surface 50 of the sleeve 38. A bezel 52 is rigidly attached to the lock cylinder and functions in combination with the large end of a key to present a broad gripping surface by which the lock cylinder can be easily manually rotated.

Upon insertion of a suitable coded key 54 into the key slot 42, the side bar is withdrawn to allow rotation of the lock cylinder from the locked position, FIGS. 2 and 5, to a position rotating the sector 34 to cause translation of the shift bolt 24 leftwardly and simultaneously moving the ignition switch 22 to "on" or "start" conditions. Rotation of the lock cylinder by the key in the opposite direction returns the shift bolt 24 rightwardly placing the ignition switch 22 in "off."

Coincidentally with this locking and unlocking function respective to the ignition switch 22, the steering shaft 18 is placed in locked or unlocked condition. Mounted on the upper end of the steering shaft 18 by spline or like connection 56 is the hub of a steering shaft keeper plate 58. The peripheral edge portions of the keeper plate are provided with a series of keeper recesses or notches 60 for receiving the head of a steering shaft lock bolt 62. As seen best in FIGS. 2 and 5, the lock bolt 62 includes a latch keeper groove 64 having an annular surface 66 and an end portion 68 of reduced diameter bounded by a shoulder 70 and a retaining flange 72. The lock bolt is closely slidably fitted within a suitable bore 74 of the housing 26 for slidable movement between a locking position, FIG. 5, and an unlocking position, FIG. 2. Bolt 62 is moved through these positions by a connection with the shift bolt 24 including a fork 76 of the latter, FIG. 4, hooked over the end portion 68 of the lock bolt and engaged by one end of a coil compression spring 78 bearing at its other end on shoulder 70 of the lock bolt 62. Accordingly, upon rotation of the lock cylinder from the locked position, moving the shift bolt 24 leftwardly, the fork 76 thereof engaged with the retainer 72 on lock bolt 62 carries the latter leftwardly also and removes the lock bolt from locking to unlocking position. Opposite rotation of the lock cylinder back to locked condition moves the shift bolt 24 rightwardly and the fork carries the lock bolt 62 rightwardly through force exerted through the compression spring 78.

The coincidental lock according to this invention further includes means operative to inhibit relocking movement of the lock bolt 62. As seen best in FIGS. 2 through 10, the inhibitor means includes a bracket 80 attached to housing 26 by a screw 82, FIG. 3, generally adjacent lock bolt bore 74, shown schematically in FIG. 8. A rivet 84 is rigidly attached to the bracket 80 and supports a latch 86 for pivotal movement between a latched position, FIGS. 2 and 6, engaging surface 66 on the latch bolt and an unlatched position, FIG. 5, remote from the latch bolt, the latch including a blocking arm 88 and a tab 90, FIG. 8. An intermediate lever 92 having a foot 94 thereon is also rotatably supported on rivet 84 while a spring clip 96 with one arm bearing on tab 90 and the other arm bearing on a side edge of the intermediate lever functions to yieldingly urge the latch and intermediate lever in opposite directions of rotation until an edge of tab 90 engages a lifting edge 98 of the intermediate lever. A spring 100 seated on housing 26 and bearing against another edge of the intermediate lever, FIG. 6, biases the latter in a clockwise direction.

A push rod 102 is slidably supported in a groove 104 in the housing 26, the groove being juxtaposed to the sleeve 38. A lower tab 106 on the end of the push rod bears against foot 94 on the intermediate lever and a similar upper tab 108 on the other end of the push rod is received in a longitudinally extending groove 110 in the large diameter portion 44 of the lock cylinder. The spring 100 is operative through engagement of the lifting edge 98 of intermediate lever on tab 90 to bias the latch 86 to the unlatched position, FIG. 5, while foot 94 on the intermediate lever presses lower tab 106 on the push rod against the lower end of sleeve 38, thus placing the push rod in an extended position with the upper tab 108 situated at the top of groove 110 in the lock cylinder.

Referring to FIGS. 6 and 7, the groove 110 extends into the lock cylinder to the key slot 42 and also longitudinally of the lock cylinder into the small diameter portion 46. The groove, however, deviates from a straight longitudinal path at the left end thereof, FIG. 7, and extends angularly across the plane of the key slot to form a cavity 112 in the lock cylinder communicating with the key slot, FIG. 9.

As seen best in FIGS. 6, 9 and 10, a key engaging pawl 114 is rigidly connected by a web 116 to an actuator 118, the pawl and actuator being slidably mounted in the groove 110 and retained therein by a strap 120 attached to the lock cylinder on opposite sides of the groove. The actuator 118 projects outward from the plane of the web to overlap upper tab 108 on the push rod while the pawl 114 projects inward beyond the edge of the key slot. As seen best in FIG. 6, the leading edge of the key 54 is relieved and presents a surface 122 adapted to engage the pawl 114 when the key is inserted in the lock cylinder.

A typical operational sequence of the inhibitor means normally begins with key 54 withdrawn from the lock cylinder and the latter secured against rotation while positioning lock bolt 62 in the locking position thereof engaging keeper plate 58 to prevent movement of the steering shaft. The surface 122 on the key, upon insertion of the latter into the key slot, engages pawl 114 and functions to pull the pawl axially along key slot 42. The movement of the pawl is, of course, accompanied by similar axial movement of the actuator 118 which, in turn, bodily moves push rod 102 downward from the extended to a retracted position, FIGS. 2 and 6. The push rod, engaging foot 94 on the intermediate lever, rotates the intermediate lever counterclockwise, FIG. 6, against the action of spring 100. The latch 86 rotates as a unit with the intermediate lever until blocking arm 88 comes to rest on one of the coils of spring 78 whereupon continued rotation of the intermediate lever initiates flexure of spring clip 96 which thus functions to resiliently urge latch in a counterclockwise direction, FIG. 6.

Unitary movement of the pawl and the actuator continues until the pawl reaches the non-axial position of slot 110 whereupon continued inserting movement of the key is accompanied by lateral movement of the pawl as the groove cams the latter off of surface 122 on the key and into cavity 112, FIGS. 2 and 9. As pawl 114 separates from the surface 122 on the key, the latter slides past the cavity 112 so that the side surface 124 of the key closes the cavity and captures the pawl therein. Thus captured, the pawl holds the actuator as shown in FIGS. 2 and 6 depressing the push rod to the retracted position and the intermediate lever and maintaining the latch 86 biased toward blocking position.

When the key is fully inserted, the tumblers in the lock cylinder withdraw the side bar to free the lock cylinder for rotary movement whereupon the actuator 118 is carried off of the upper tab 108 on the push rod. Movement of the actuator is, however, accompanied by movement of shoulder 48 on the lock cylinder over the tab 108 on the push rod so that the latter is held in the retracted position, FIGS. 2 and 6, as the lock cylinder is rotated to the various operating positions.

As described hereinbefore, rotation of the lock cylinder withdraws the lock bolt 62 from the locking to the unlocking position. As the lock bolt is withdrawn, it and spring 78 are drawn along under blocking arm 88 until, in the unlocking position, the groove 64 underlies the blocking arm which then drops behind annular surface 66 under the urging of spring clip 96 as the latch moves to the latched position, FIGS. 2 and 6.

The blocking arm, in the latched position of latch, prevents return movement of the lock bolt 62 independently of the position of the lock cylinder. More particularly, as seen best in FIG. 2, when the lock cylinder is returned to the normal systems locking position, the shift bolt 24 is drawn rightwardly to deactivate the ignition switch. The lock bolt 62, however, is restrained by the blocking arm 88 so that spring 78 is compressed by fork 76. No movement of the lock bolt occurs until key 54 is withdrawn sufficiently from the key slot to release pawl 114 from cavity 112, whereupon the restraint provided by the actuator 118 through the push rod on the intermediate lever is removed. Spring 100 then rotates the intermediate lever clockwise, FIGS. 2 and 6, lifting edge 98 on the latter engaging tab 90 to simultaneously pivot the latch 86 from the latched to the unlatched position. In the unlatched position of the latch 86, the spring 78 projects the lock bolt 62 past the blocking arm from the unlocking to the locking position. Spring 100, through the intermediate lever, then repositions the push rod in the extended position, FIG. 5, the push rod, in turn, positioning the actuator 118 and pawl 114 in position to initiate an identical operational sequence when key 54 is reinserted in the key slot.

Having thus described the invention, what is claimed is:

1. In an automotive steering column structure including, a support column mounted on the vehicle, a steering shaft rotatably mounted within said support column and operatively connected to the vehicle steering gear, a keeper plate fixed to said steering shaft for unitary rotation therewith in a plane extending generally transversely of said support column, a steering shaft lock bolt supported on said support column for bodily movement between a locking position engaging said keeper plate and preventing movement of said steering shaft and an unlocking position remote from said keeper plate, lock means including a sleeve rigidly attached to said support column and a lock cylinder supported on said sleeve for rotary movement and normally secured thereagainst but adapted to receive in a key slot therein a key by which said lock cylinder is freed for rotary movement between a plurality of angular positions, and means connecting said lock cylinder to said lock bolt and operative in response to rotary movement of said lock cylinder to move said lock bolt between the locking and the unlocking positions, the combination comprising, latch means, means supporting said latch means on said support column for movement between latched and unlatched positions respectively engaging said latch bolt in the unlocking position thereof to prevent movement to the locking position and remote from said latch bolt, a push rod, means supporting said push rod in said support column for bodily movement between extended and retracted positions, spring means between said push rod and said latch operative in the retracted position of the former to yieldingly urge said latch toward the latched position thereof, means on one of said lock cylinder and said sleeve defining a cavity therein in communication with said key slot, a pawl, means supporting said pawl on said one of said lock cylinder and said sleeve for bodily movement between a first position spaced from said cavity and projecting into said key slot and a second position in said cavity, said pawl in the first position thereof being engageable on said key in response to insertion of the latter in said key slot and said key thereafter being operative to bodily move said pawl from the first to the second position thereof, means on said key operative in the inserted position thereof to close said cavity and thereby capture said pawl therein, and means connecting said pawl to said push rod so that said pawl in said second position thereof is operative to maintain said push rod in the retracted position thereof.

2. In an automotive steering column structure including, a support column mounted on the vehicle, a steering shaft rotatably mounted within said support column and operatively connected to the vehicle steering gear, a keeper plate fixed to said steering shaft for unitary rotation therewith in a plane extending generally transversely of said support column, a steering shaft lock bolt supported on said support column for bodily movement longitudinally of the latter between a locking position engaging said keeper plate and preventing movement of said steering shaft and an unlocking position remote from said keeper plate, lock means including a sleeve rigidly attached to said support column and a lock cylinder supported on said sleeve for rotary movement and normally secured thereagainst but adapted to receive in a key therein a key by which said lock cylinder is freed for rotary movement between a plurality of angular positions, and means connecting said lock cylinder to said lock bolt and operative in response to rotary movement of said lock cylinder to move said lock bolt between the locking and the unlocking positions, the combination comprising, latch means, means supporting said latch means on said support column for movement between latched and unlatched positions respectively engaging said latch bolt in the unlocking position thereof to prevent movement to the locking position and remote from said latch bolt, a push rod, means supporting said push rod on said support column for bodily movement between extended and retracted positions, spring means between said push rod and said latch operative in the retracted position of the former to yieldingly urge said latch toward the latched position thereof, means on said lock cylinder defining a groove therein, said groove communicating with said key slot and terminating at one end in a cavity juxtaposed to and communicating with said key slot, a pawl, means supporting said pawl on said lock cylinder for bodily movement in said groove between a first position spaced from said cavity and projecting into said key slot and a second position in said cavity, said pawl in the first position thereof being engageable on said key in response to insertion of the latter in said key slot and said key thereafter being operative to bodily move said pawl from the first to the second position thereof, means on said key operative in the inserted position thereof to close said cavity and thereby capture said pawl therein, an actuator member, and means rigidly connecting said actuator member to said pawl for bodily movement as a unit therewith in said groove, said actuator member being engageable on said push rod and operative in response to bodily movement of said pawl to the second position thereof to move said push rod to the retracted position thereof and to maintain said push rod in the retracted position.

3. In an automotive steering column structure including, a support column mounted on the vehicle, a steering shaft rotatably mounted within said support column and operatively connected to the vehicle steering gear, a keeper plate fixed to said steering shaft for unitary rotation therewith in a plane extending generally transversely of said support column, a steering shaft lock bolt supported on said support column for bodily movement longitudinally of the latter between a locking position engaging said keeper plate and preventing movement of said steering shaft and an unlocking position remote from said keeper plate, lock means including a sleeve rigidly attached to said support column and a lock cylinder supported on said sleeve for rotary movement and normally secured thereagainst but adapted to receive in a key slot therein a key by which said lock cylinder is freed for rotary movement between a plurality of angular positions, and means connecting said lock cylinder to said lock bolt and operative in response to rotary movement of said lock cylinder to move said lock bolt between the locking and the unlocking positions, the combination comprising, a latch, means supporting said latch on said support column for pivotal movement between a latched position engaging said lock bolt in the unlocking position thereof to prevent movement to the locking position and an unlatched position remote from said lock bolt, an intermediate lever, means pivotally supporting said intermediate lever on said support column, spring means between said latch and said intermediate lever, a push rod, means supporting said push rod on said support column for bodily movement between an extended position and a retracted position, means operatively connecting said intermediate lever and said push rod so that the latter is operative in the retracted position thereof to compress said spring means and thereby yieldingly urge said latch toward the latched position thereof, means on said lock cylinder defining a groove therein, said groove communicating with said key slot and terminating at one end in a cavity juxtaposed to and communicating with said key slot, a pawl, means supporting said pawl on said lock cylinder for bodily movement in said groove between a first position spaced from said cavity and projecting into said key slot and a second position in said cavity, said pawl in the first position thereof being engageable on said key in response to insertion of the latter in said key slot and said key thereafter being operative to bodily move said pawl from the first to the second position thereof, means on said key operative in the inserted position thereof to close said cavity and thereby capture said pawl therein, an actuator member, and means rigidly connecting said actuator member to said pawl for bodily movement as a unit therewith in said groove, said actuator member being engageable on said push rod and operative in response to bodily movement of said pawl to the second position thereof to move said push rod to the retracted position thereof and to maintain said push rod in the retracted position.

* * * * *